(12) United States Patent
Homma

(10) Patent No.: US 8,273,492 B2
(45) Date of Patent: *Sep. 25, 2012

(54) LOAD APPLYING MECHANISM IN A FUEL CELL SYSTEM

(75) Inventor: Hiroki Homma, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 1304 days.

This patent is subject to a terminal disclaimer.

(21) Appl. No.: 11/317,965

(22) Filed: Dec. 22, 2005

(65) Prior Publication Data

US 2006/0134499 A1    Jun. 22, 2006

(30) Foreign Application Priority Data

Dec. 22, 2004   (JP) ................................. 2004-370773

(51) Int. Cl.
*H01M 8/24* (2006.01)
*H01M 2/08* (2006.01)
*H01M 8/06* (2006.01)
*H01M 8/04* (2006.01)

(52) U.S. Cl. ........ 429/460; 429/469; 429/470; 429/511; 429/416; 429/434

(58) Field of Classification Search .............. 429/12–46, 429/400–535
See application file for complete search history.

(56) References Cited

U.S. PATENT DOCUMENTS

| | | | |
|---|---|---|---|
| 4,849,308 A * | 7/1989 | Schmitten et al. | 429/37 |
| 5,330,858 A * | 7/1994 | Shundou et al. | 429/22 |
| 5,595,834 A * | 1/1997 | Wilson et al. | 429/30 |
| 5,851,689 A | 12/1998 | Chen | |
| 5,998,053 A | 12/1999 | Diethelm | |
| 6,042,956 A | 3/2000 | Lenel | |
| 6,348,280 B1 | 2/2002 | Maeda et al. | |
| 6,440,596 B1 * | 8/2002 | Ruhl et al. | 429/34 |
| 6,773,843 B2 * | 8/2004 | Kitagawa et al. | 429/457 |
| 2003/0072979 A1 * | 4/2003 | Hill et al. | 429/13 |
| 2003/0198861 A1 * | 10/2003 | Bai et al. | 429/44 |
| 2004/0062967 A1 * | 4/2004 | Chaix | 429/32 |
| 2005/0136316 A1 * | 6/2005 | Tsunoda et al. | 429/37 |

(Continued)

FOREIGN PATENT DOCUMENTS

JP    60-205972    10/1985

(Continued)

OTHER PUBLICATIONS

International Search Report for Application No. PCT/JP2005/024179, dated Feb. 6, 2007.

(Continued)

*Primary Examiner* — Basia Ridley
*Assistant Examiner* — Jonathan G Leong
(74) *Attorney, Agent, or Firm* — Nelson Mullins Riley & Scarborough LLP; Anthony A. Laurentano

(57) ABSTRACT

A fuel cell system includes a fuel cell stack, a fluid unit, and a load applying mechanism. The fluid unit includes a heat exchanger and a reformer provided on one side of the fuel cell stack, and the load applying mechanism is provided on the other side of the fuel cell stack. The load applying mechanism includes first and second tightening units for applying different loads to desired regions of the fuel cell stack in the stacking direction.

8 Claims, 13 Drawing Sheets

U.S. PATENT DOCUMENTS

2005/0142425 A1* 6/2005 Homma .................. 429/38
2008/0008917 A1 1/2008 Homma

FOREIGN PATENT DOCUMENTS

| JP | 61-58176 | 3/1986 |
|----|----------|--------|
| JP | 62-165874 | 7/1987 |
| JP | 64-3971 | 1/1989 |
| JP | 08/115737 | 5/1996 |
| JP | 10/032016 | 2/1998 |
| JP | 10-55815 | 2/1998 |
| JP | 10-64568 | 3/1998 |
| JP | 2001-93564 | 4/2001 |
| JP | 2001-508591 | 6/2001 |
| JP | 2002-302785 | 10/2002 |
| JP | 2004/039554 | 2/2004 |
| JP | 2004-362995 | 12/2004 |
| JP | 2005-190867 | 7/2005 |
| JP | 2006-179289 | 7/2006 |
| WO | WO 99/44252 * | 9/1999 |
| WO | WO-99/44252 A1 | 9/1999 |

OTHER PUBLICATIONS

Japanese Office Action for Application No. 2004-370773, dated Nov. 17, 2009.

* cited by examiner

PRIOR ART

LOAD APPLYING MECHANISM IN A FUEL CELL SYSTEM

BACKGROUND OF THE INVENTION

1. Field of the Invention

The present invention relates to a fuel cell system including a fuel cell stack, a heat exchanger, a reformer, and a load applying mechanism provided in a casing.

2. Description of the Related Art

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or the air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

For example, Japanese Patent Publication No. 6-24137 proposes to adopt a fuel cell in which the cell tightening surface pressure applied to respective cells can be set uniformly to a suitable value in order to achieve high performance and long life of the fuel cell. In the conventional technique, as shown in FIG. 13, the fuel cell includes a plurality of, e.g., three small stacks 1 disposed separately in a cell container 2.

Each of the small stacks 1 includes a cell stack 1*a* and cell tightening plates 1*b* provided on opposite sides of the cell stack 1*a*. Four tightening bolts 1*c* are inserted into the two upper and lower cell tightening plates 1*b*. Tightening nuts 1*e* are fitted to the respective tightening bolts 1*c* through tightening springs 1*d* to form the small stack 1. Further, the small stacks 1 are supported by three small stack support plates 3. Four support bolts 4 are inserted to the small stack support plates 3. Support nuts 5 are fitted to opposite ends of the support bolt 4.

However, in the conventional technique, since the four tightening bolts 1*c* are provided on the sides of the cell stack 1*a* of each small stack 1, the width of the small stack 1 in the direction perpendicular to the stacking direction of the small stack 1 is large.

Further, the small stack support plates 3 and the four support bolts 4 are provided for supporting the three small stacks 1, the space required for the entire fuel cell stack is considerably large. Accordingly, the size of the cell container 2 containing the fuel cell stack is large. Therefore, the space for the fuel cell stack is not utilized efficiently, and the heat capacity is large.

SUMMARY OF THE INVENTION

A main object of the present invention is to provide a fuel cell system in which it is possible to simplify and reduce the overall size of the system, and reduce the heat capacity.

According to the present invention, a fuel cell system includes a fuel cell stack, a heat exchanger, a reformer, a load applying mechanism, and a casing. The fuel cell stack is formed by stacking a plurality of fuel cells in a stacking direction. Each of the fuel cells includes an electrolyte electrode assembly and separators sandwiching the electrolyte electrode assembly. The electrolyte electrode assembly includes an anode, a cathode, and an electrolyte interposed between the anode and the cathode. The heat exchanger is provided on one side of the fuel cell stack for heating an oxygen-containing gas to be supplied to the fuel cell stack. The reformer is provided on the one side of the fuel cell stack for reforming fuel to produce a fuel gas. The load applying mechanism is provided on the other side of the fuel cell stack for applying a tightening load to the fuel cell stack in the stacking direction. The casing contains the fuel cell stack, the heat exchanger, the reformer, and the load applying mechanism.

The load applying mechanism includes a first tightening unit for applying a load to a predetermined seal region of the fuel cell stack in the stacking direction and a second tightening unit for applying a load to the electrolyte electrode assembly in the stacking direction. The load applied by the second tightening unit is smaller than the load applied by the first tightening unit.

Further, it is preferable that the load applying mechanism includes a heat barrier for shielding the heat transmitted from one side of the fuel cell stack. Further, it is preferable that the heat barrier is interposed between the other side of the fuel cell stack and the load applying mechanism, and includes a plate member supported by the casing.

Further, it is preferable that the first tightening unit supports the load in the stacking direction through an end plate provided on one side of the fuel cell stack. Further, it is preferable that the fuel cell stack includes a fuel gas supply unit extending in the stacking direction for supplying the fuel gas to the anode, and the first tightening unit applies a tightening load in the stacking direction to a seal region of the fuel gas supply unit.

It is preferable that the first tightening unit includes a first bolt screwed into the end plate provided on one side of the fuel cell stack and a first plate member which engages the first bolt for applying the load in the stacking direction to a predetermined seal region of the fuel cell stack, and the second tightening unit includes a second bolt screwed into the end plate, a second plate member which engages the second bolt, and a spring member interposed between the second plate member and the fuel cell stack for applying the load in the stacking direction to the electrolyte electrode assembly.

According to the present invention, the heat exchanger and the reformer are provided on one side of the fuel cell stack, and the load applying mechanism is provided on the other side of the fuel cell stack. Therefore, the load applying mechanism is not exposed to the hot exhaust gas or the hot air. With the simple structure, durability of the load applying mechanism is improved suitably.

Further, the first tightening unit and the second tightening unit for applying different loads are provided at the center of the separators. Thus, reduction in the overall size of the load applying mechanism is achieved. Consequently, it is possible to reduce the size of the system as a whole. The fuel cell stack, the heat exchanger, and the reformer can be provided in a small space. The heat capacity can be reduced easily, and the heat loss is reduced.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
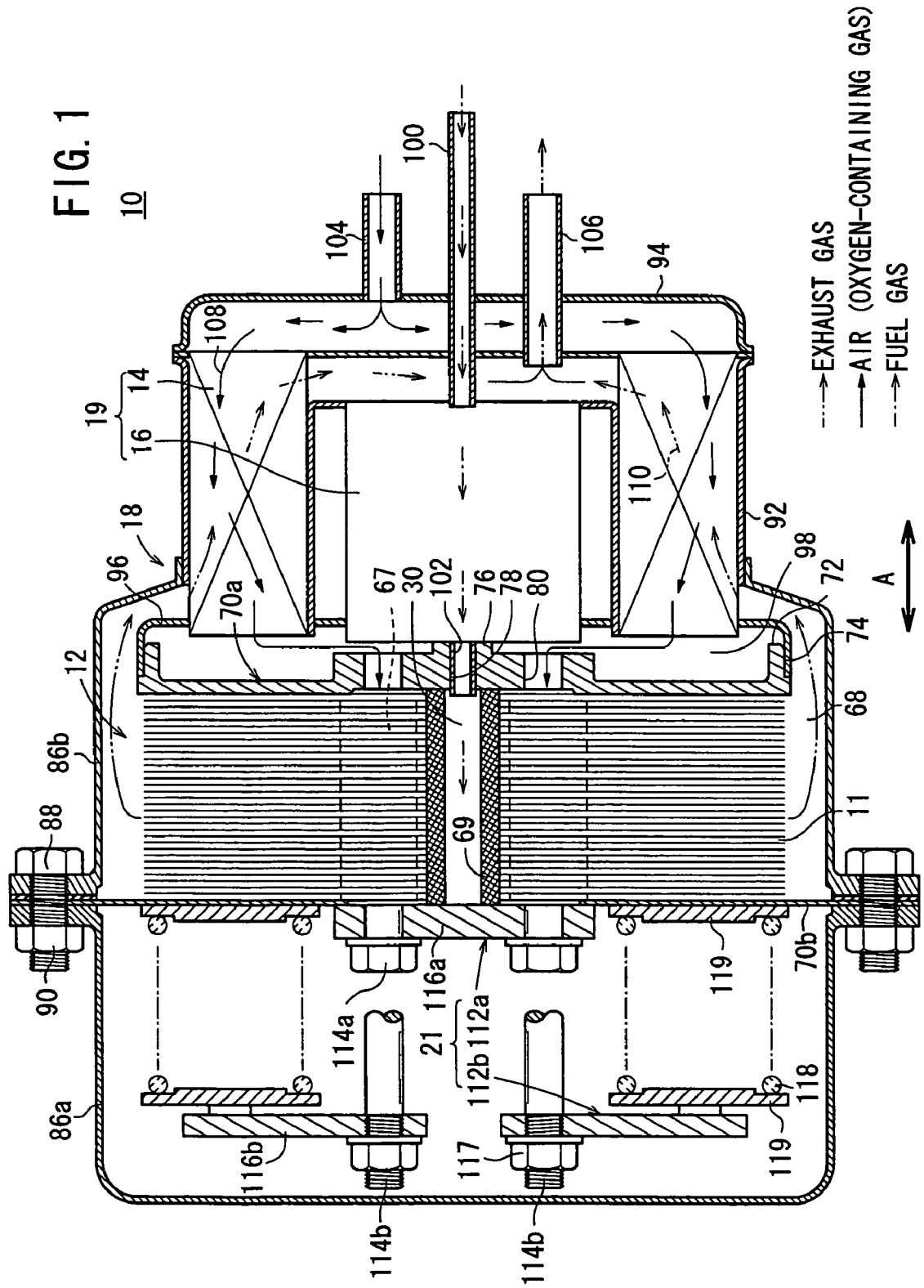
FIG. 1 is a partial cross sectional view showing a fuel cell system according to an embodiment of the present invention.
Figure 2:
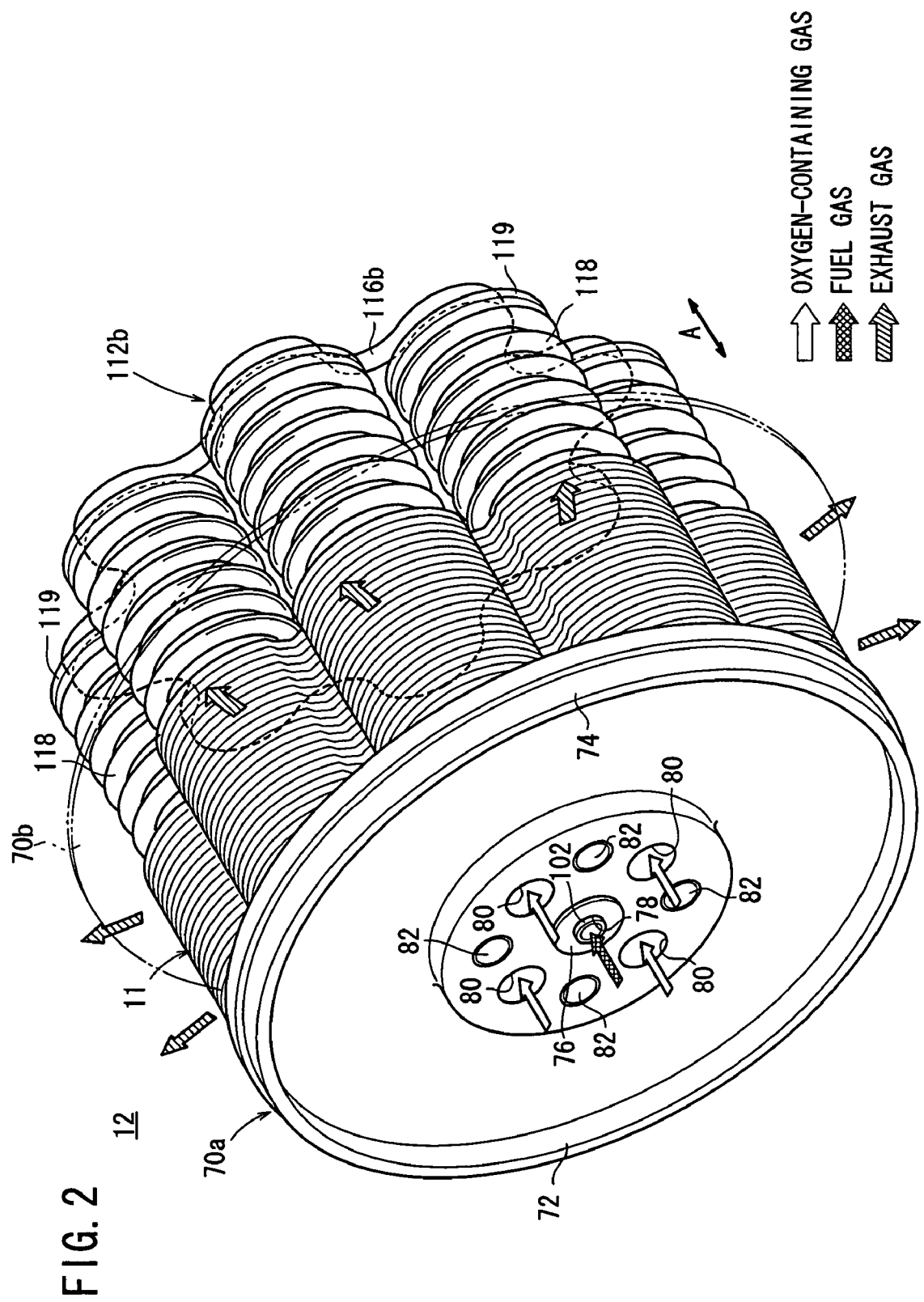
FIG. 2 is a perspective view schematically showing a fuel cell stack of the fuel cell system.

FIG. 1 is a partial cross sectional view showing a fuel cell system 10 according to an embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
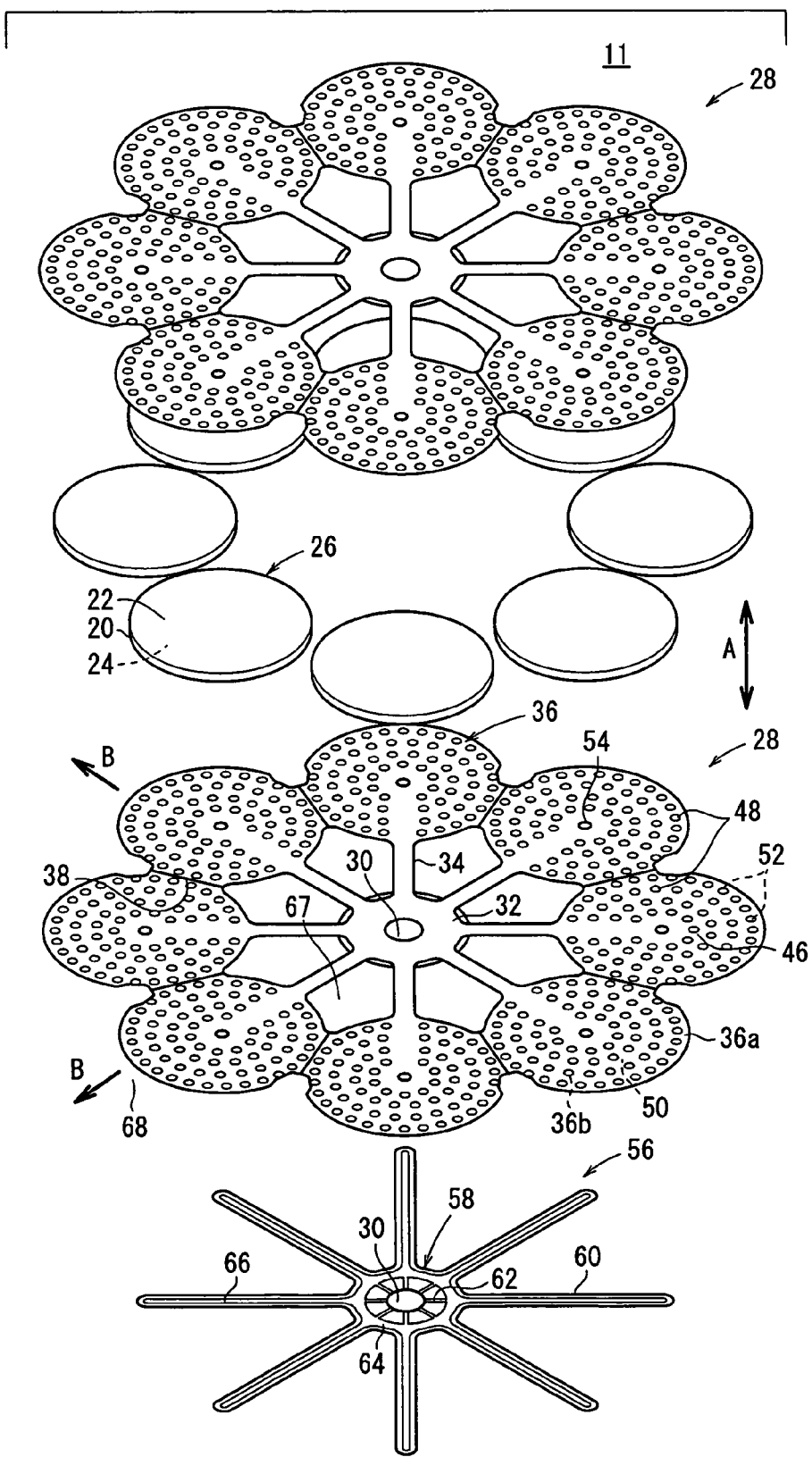
FIG. 3 is an exploded perspective view showing the fuel cell of the fuel cell stack.
Figure 4:
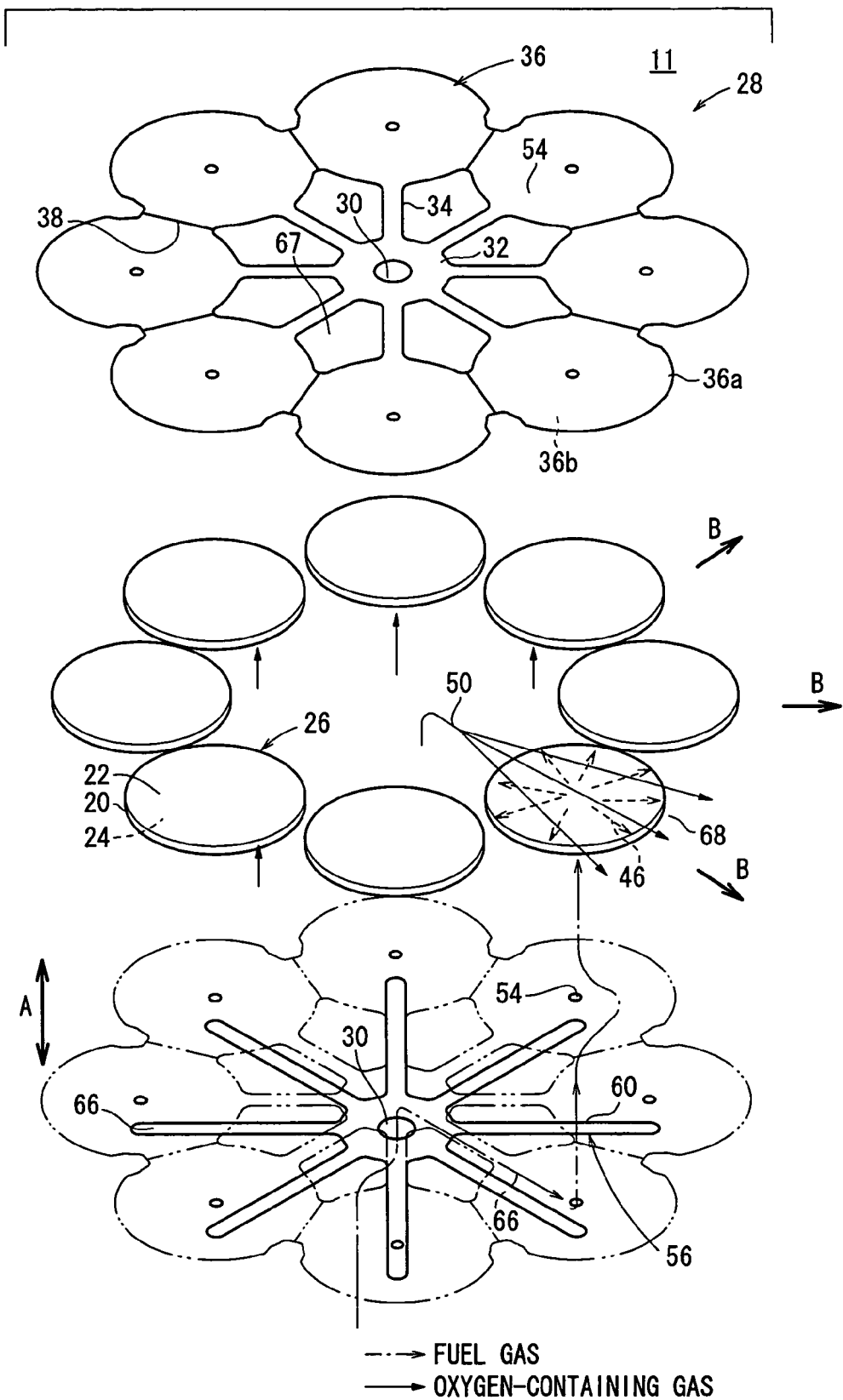
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at the inner circumferential edge of the electrolyte electrode assembly 26 for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage 30 extending through the center of the separators 28.

Figure 5:
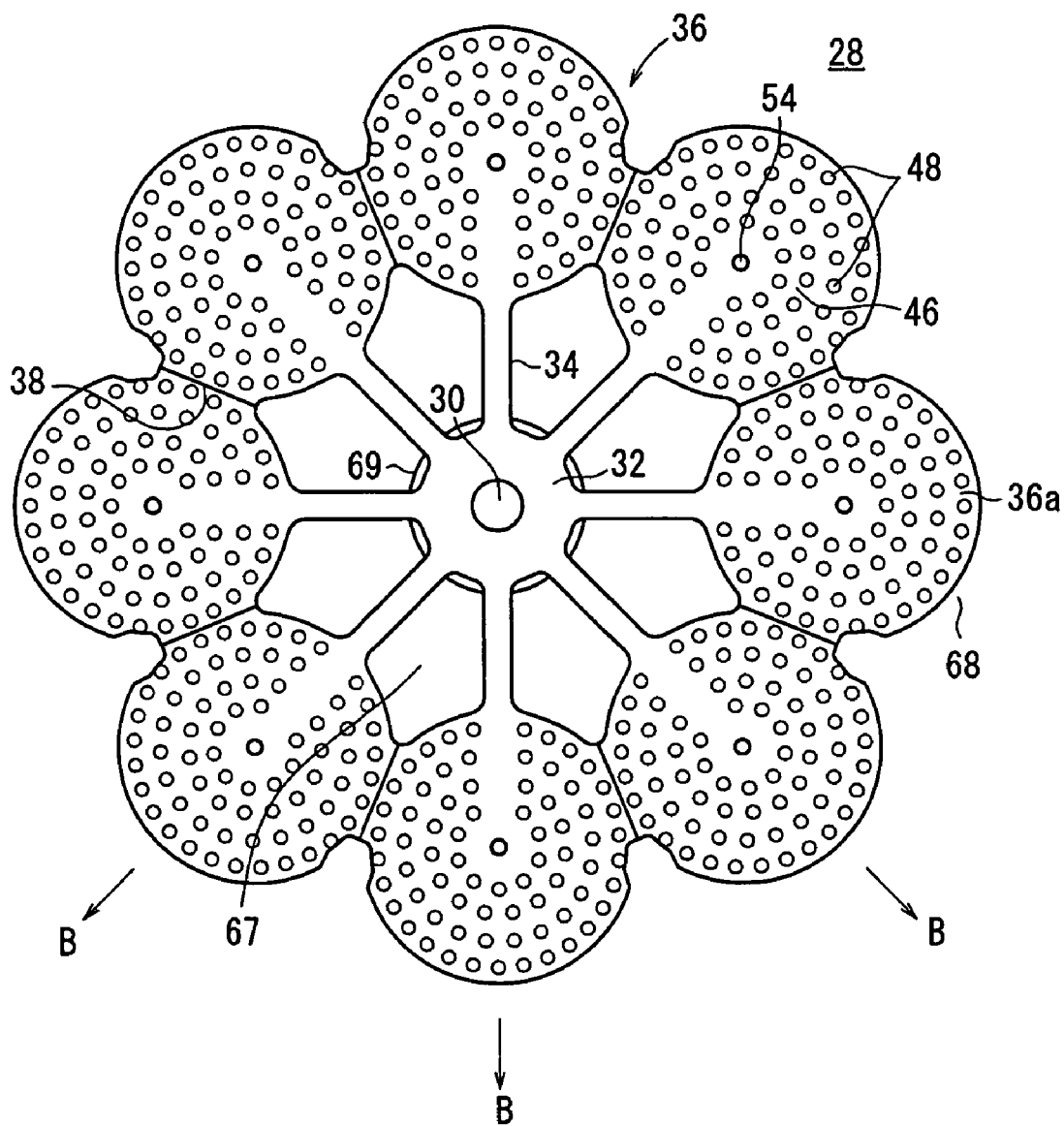
FIG. 5 is a view showing one surface of a separator.
Figure 6:
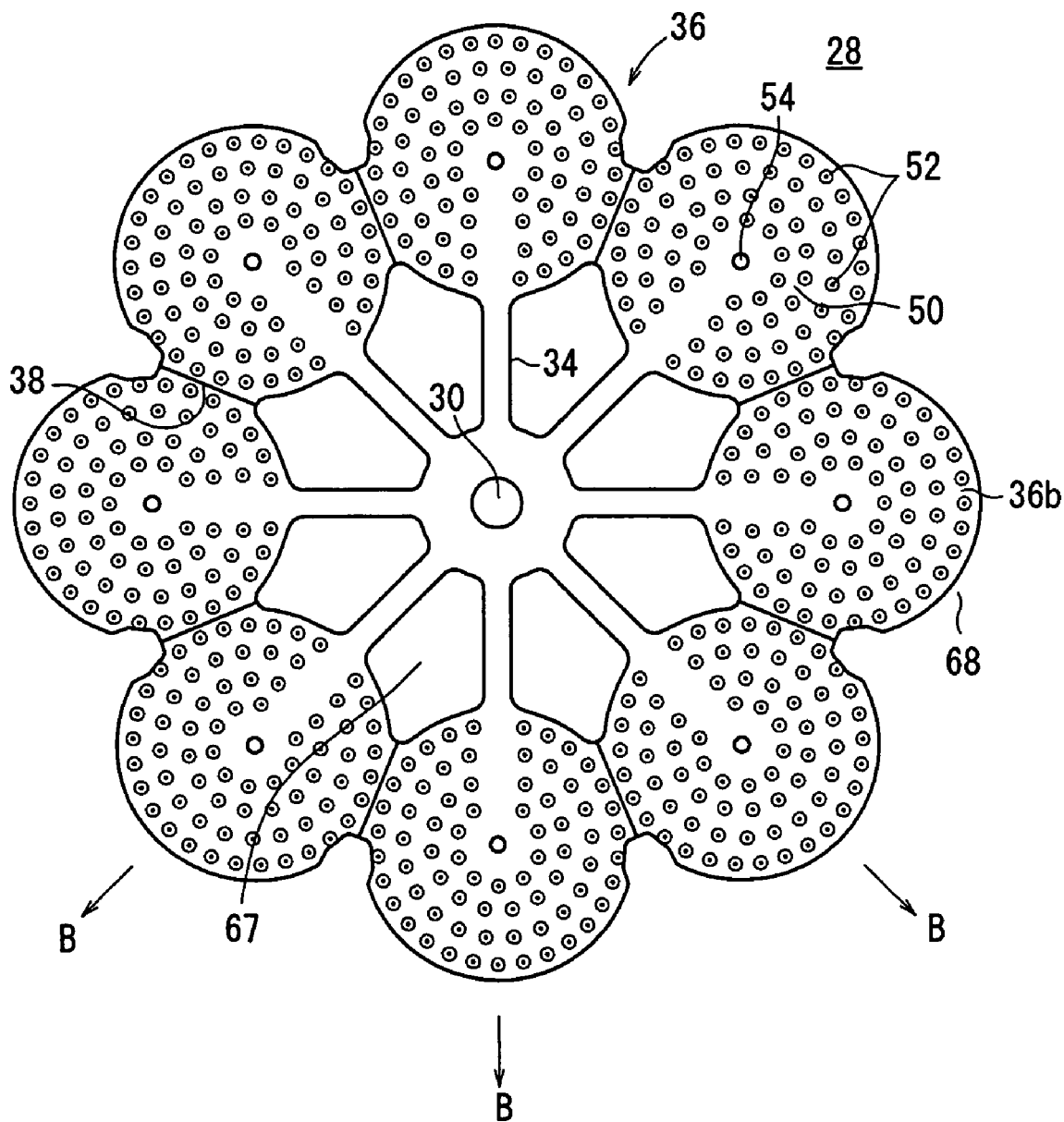
FIG. 6 is a view showing the other surface of the separator.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. As shown in FIGS. 3, 5, and 6, the adjacent circular disks 36 are separated from each other by slits 38.

Figure 7:
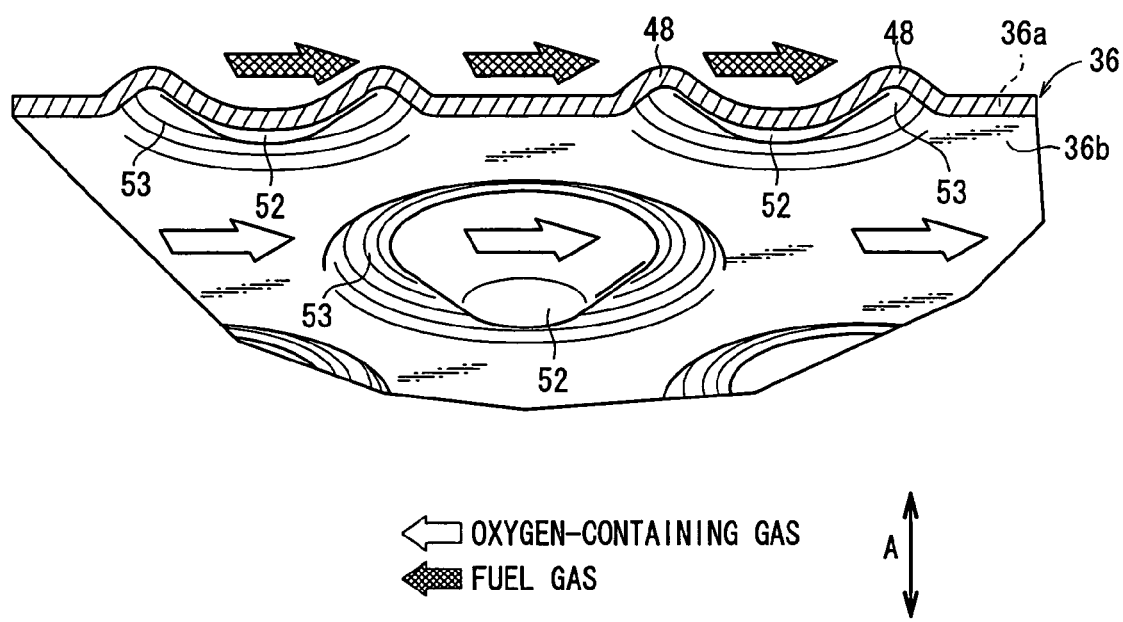
FIG. 7 is a perspective view showing first protrusions and second protrusions formed on the separator.

Each of the circular disks 36 has first protrusions 48 on its surface 36a which contacts the anode 24 (see FIG. 5). The first protrusions 48 form a fuel gas channel 46 for supplying a fuel gas along an electrode surface of the anode 24. Each of the circular disks 36 has second protrusions 52 on its surface 36b which contacts the cathode 22 (see FIG. 6). The second protrusions 52 form the oxygen-containing gas channel 50 for supplying the oxygen-containing gas along an electrode surface of the cathode 22. As shown in FIG. 7, the first protrusions 48 and the second protrusions 52 protrude away from each other.

The first protrusions 48 are ring shaped protrusions, and the second protrusions 52 are mountain shaped protrusions. The second protrusions (mountain shaped protrusions) 52 are surrounded by the first protrusions (ring shaped protrusions) 48. The second protrusions 52 are formed on the surface where recesses 53 corresponding to the first protrusions 48 are formed. Therefore, the second protrusions 52 are provided in the recesses 53.

Figure 8:
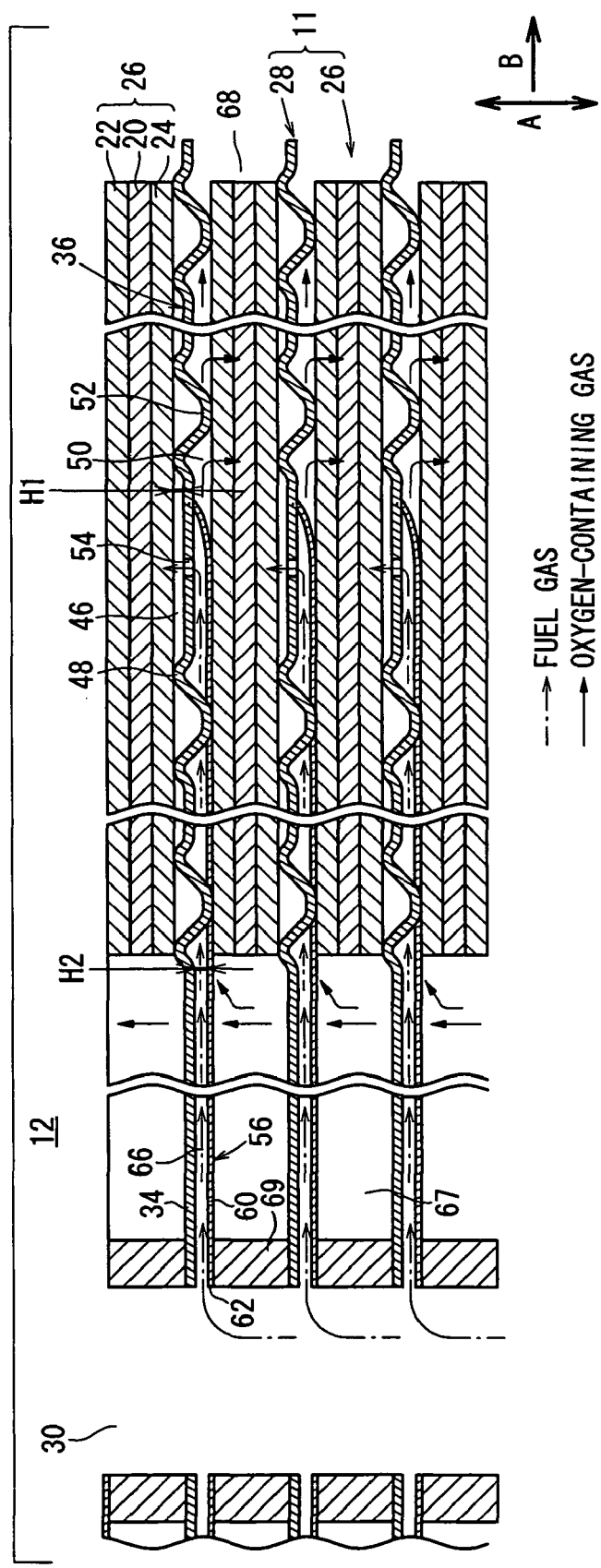
FIG. 8 is a cross sectional view showing the fuel cell stack.
Figure 9:
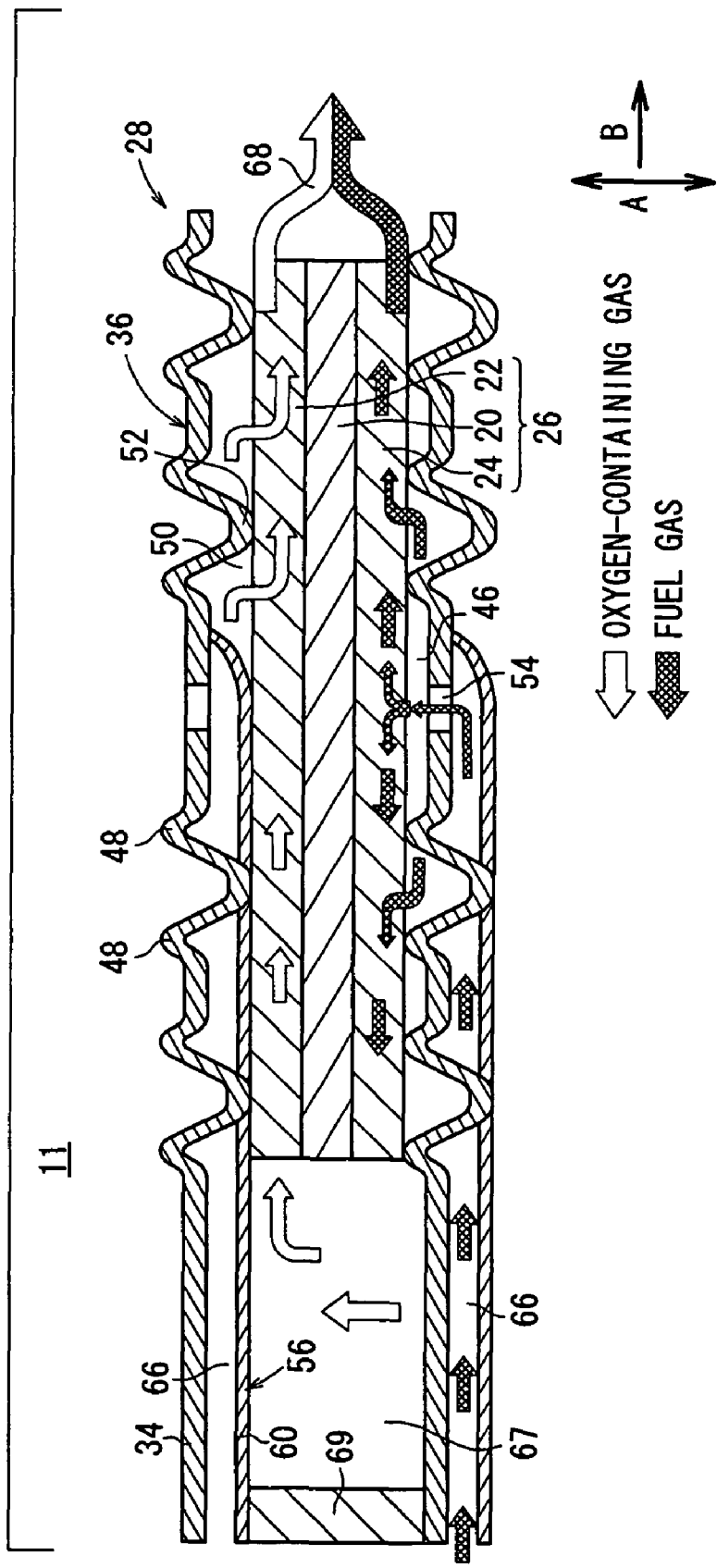
FIG. 9 is a cross sectional view schematically showing operation of the fuel cell.

As shown in FIGS. 8 and 9, a plurality of the first and second protrusions 48, 52 are provided, and the height H1 of the first protrusion 48 is smaller than the height H2 of the second protrusion 52 (H1<H2). Therefore, the volume of the oxygen-containing gas channel 50 is larger than the volume of the fuel gas channel 46.

Alternatively, the first protrusions 48 may be mountain shaped protrusions, and the second protrusions 52 may be ring shaped protrusions. In this structure, it is preferable that the height of the ring shaped protrusions is larger than the height of the mountain shaped protrusions.

As shown in FIGS. 3 to 6, a fuel gas inlet (fuel gas supply unit) 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

Figure 10:
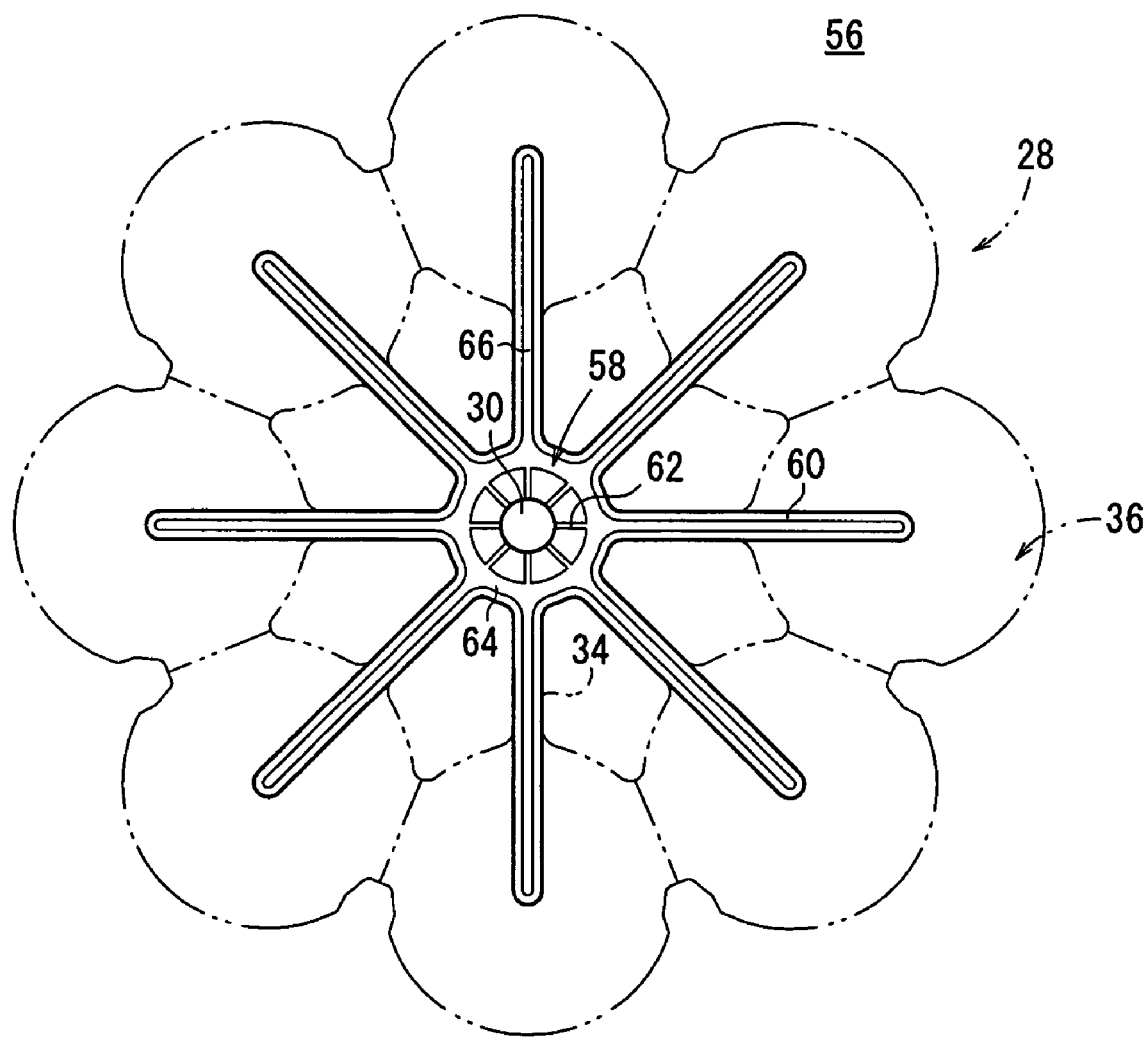
FIG. 10 is view schematically showing a channel member fixed to the separator.

A channel member 56 is fixed to the separator 28 by brazing or laser welding on a surface facing the cathode 22. As shown in FIGS. 3 and 10, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64.

As shown in FIGS. 8 and 9, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 is formed by spaces between the inner sides of the respective circular disks 36 and the first bridges 34, and extends in the stacking direction.

As shown in FIG. 8, insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A hole 78 is formed at the center of the protrusion 76.

Figure 11:
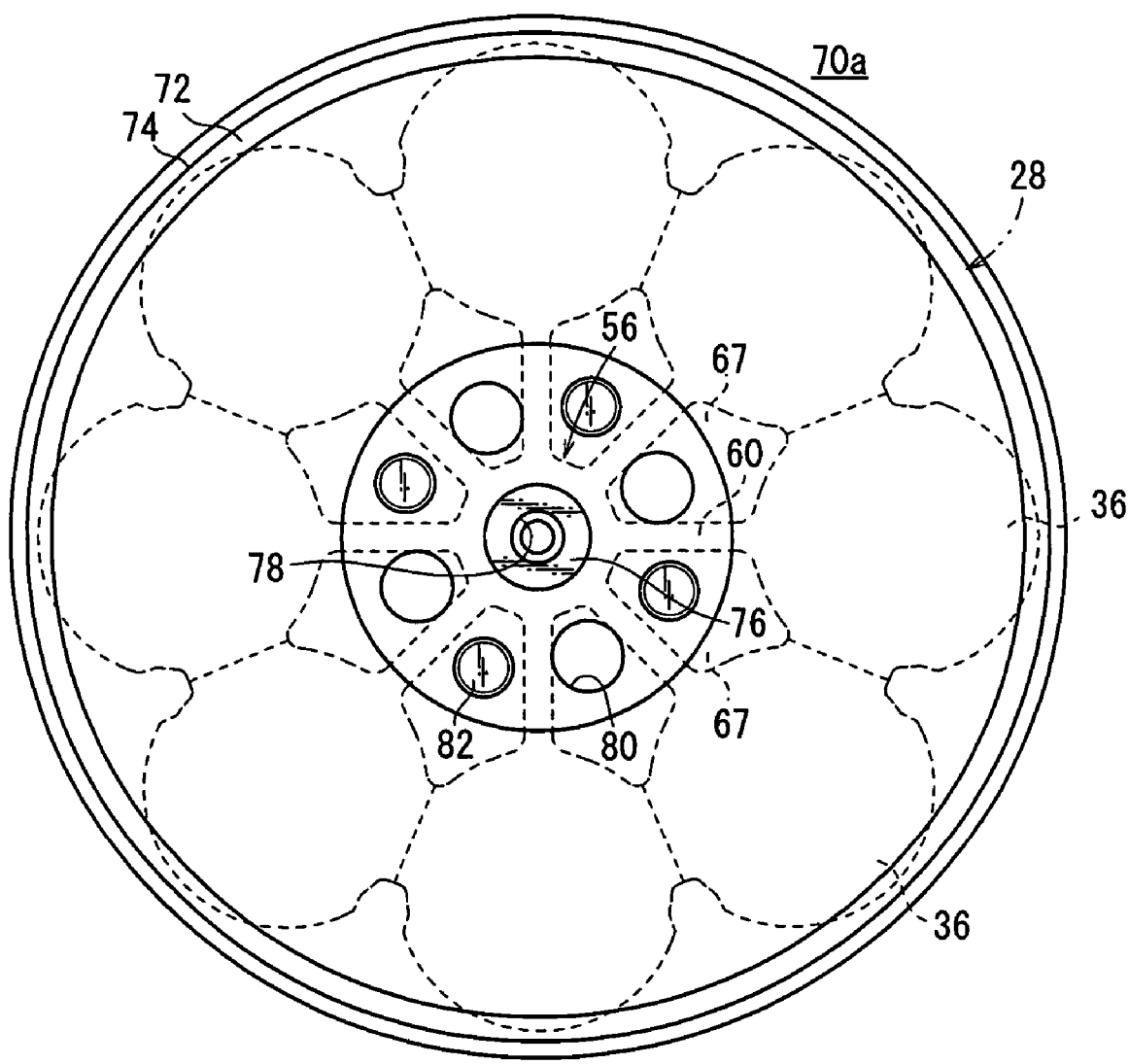
FIG. 11 is a front view showing an end plate of the fuel cell stack.

In the end plate 70a, holes 80 and screw holes 82 are formed alternately along a virtual circle around the protrusion 76. The holes 80 and the screw holes 82 are spaced from each other by predetermined intervals (angles). As shown in FIG. 11, the holes 80 and the screw holes 82 are provided at positions corresponding to respective spaces of the oxygen-containing gas supply unit 67 formed between the first and second bridges 34, 60. As shown in FIG. 1, the diameter of the end plate 70b is larger than the diameter of the end plate 70a. The end plate 70b is a thin electrically conductive plate.

The casing 18 includes a first case unit 86a containing the load applying mechanism 21 and a second case unit 86b containing the fuel cell stack 12. The end plate 70b and an insulating member are sandwiched between the first case unit 86a and the second case unit 86b. The insulating member is provided on the side of the second case unit 86b. The joint portion between the first case unit 86a and the second case unit 86b is tightened by screws 88 and nuts 90. The end plate 70b functions as a heat barrier for preventing entry of the hot exhaust gas or the hot air from the fluid unit 19 into the load applying mechanism 21.

An end of a ring shaped wall plate 92 is joined to the second case unit 86b, and a head plate 94 is fixed to the other end of the wall plate 92. The fluid unit 19 is provided symmetrically with respect to the central axis of the fuel cell stack 12. Specially, the substantially cylindrical reformer 16 is provided coaxially inside the substantially ring shaped heat exchanger 14. The heat exchanger 14 and the reformer 16 are fixed to a wall plate 96, and the wall plate 96 is fixed to the groove 74 around the end plate 70a. A chamber 98 is formed between the end plate 70a and the wall plate 96.

A fuel gas supply pipe 100 and a reformed gas supply pipe 102 are connected to the reformer 16. The fuel gas supply pipe 100 extends to the outside from the head plate 94. The reformed gas supply pipe 102 is inserted into the hole 78 of the end plate 70a, and connected to the fuel gas supply passage 30.

An air supply pipe 104 and an exhaust gas pipe 106 are connected to the head plate 94. A channel 108 extending from the air supply pipe 104 to the chamber 98 through the heat exchanger 14 and a channel 110 extending from the exhaust gas channel 68 of the fuel cell stack 12 to the exhaust gas pipe 106 through the heat exchanger 14 are provided in the casing 18.

The load applying mechanism 21 includes a first tightening unit 112a for applying a first tightening load T1 to a region around (near) the fuel gas supply passage 30 and a second tightening unit 112b for applying a second tightening load T2 to the electrolyte electrode assemblies 26. The second tightening load T2 is smaller than the first tightening load T1 (T1>T2).

Figure 12:
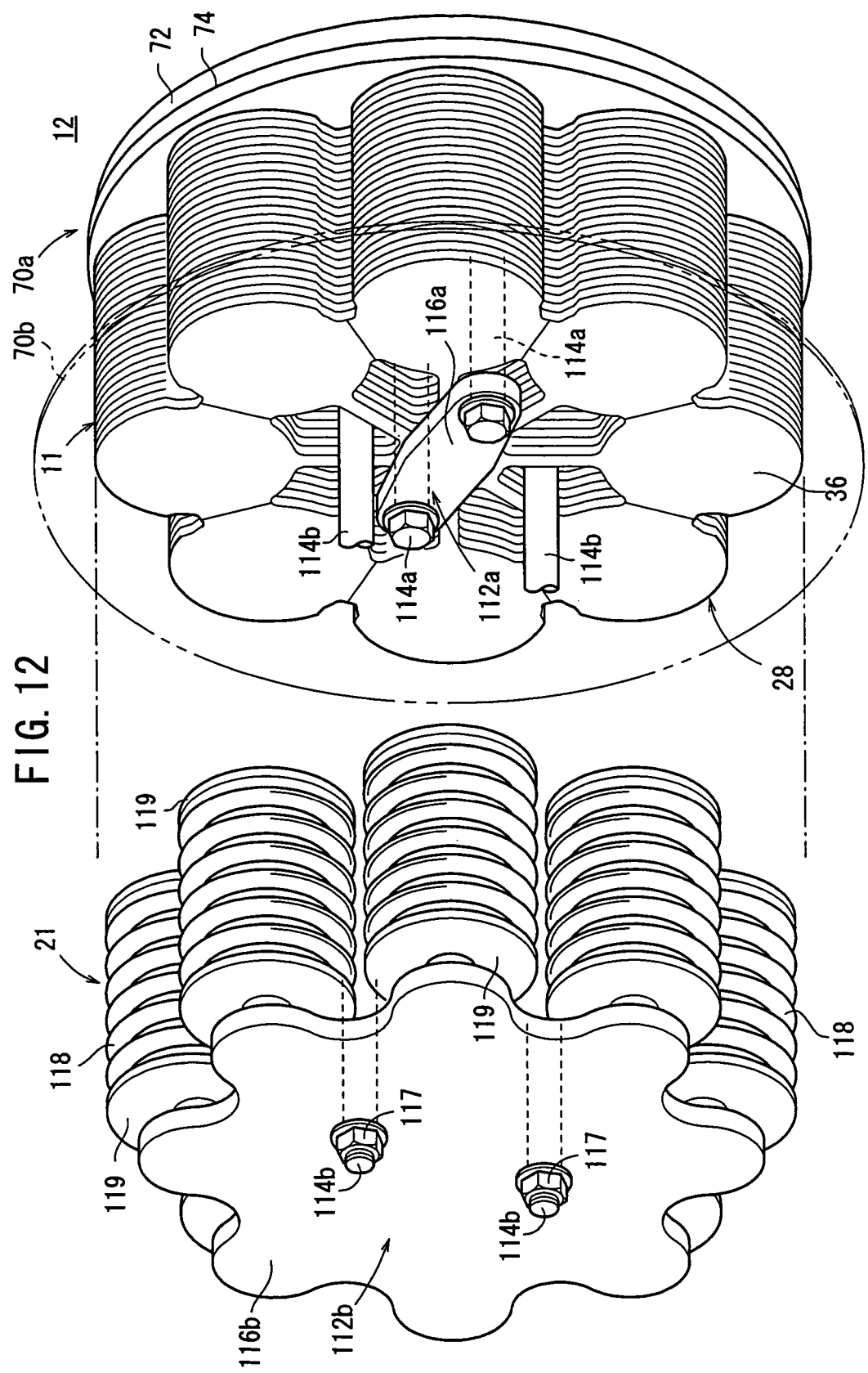
FIG. 12 is a partial exploded perspective view showing a load applying mechanism of the fuel cell system.
Figure 13:
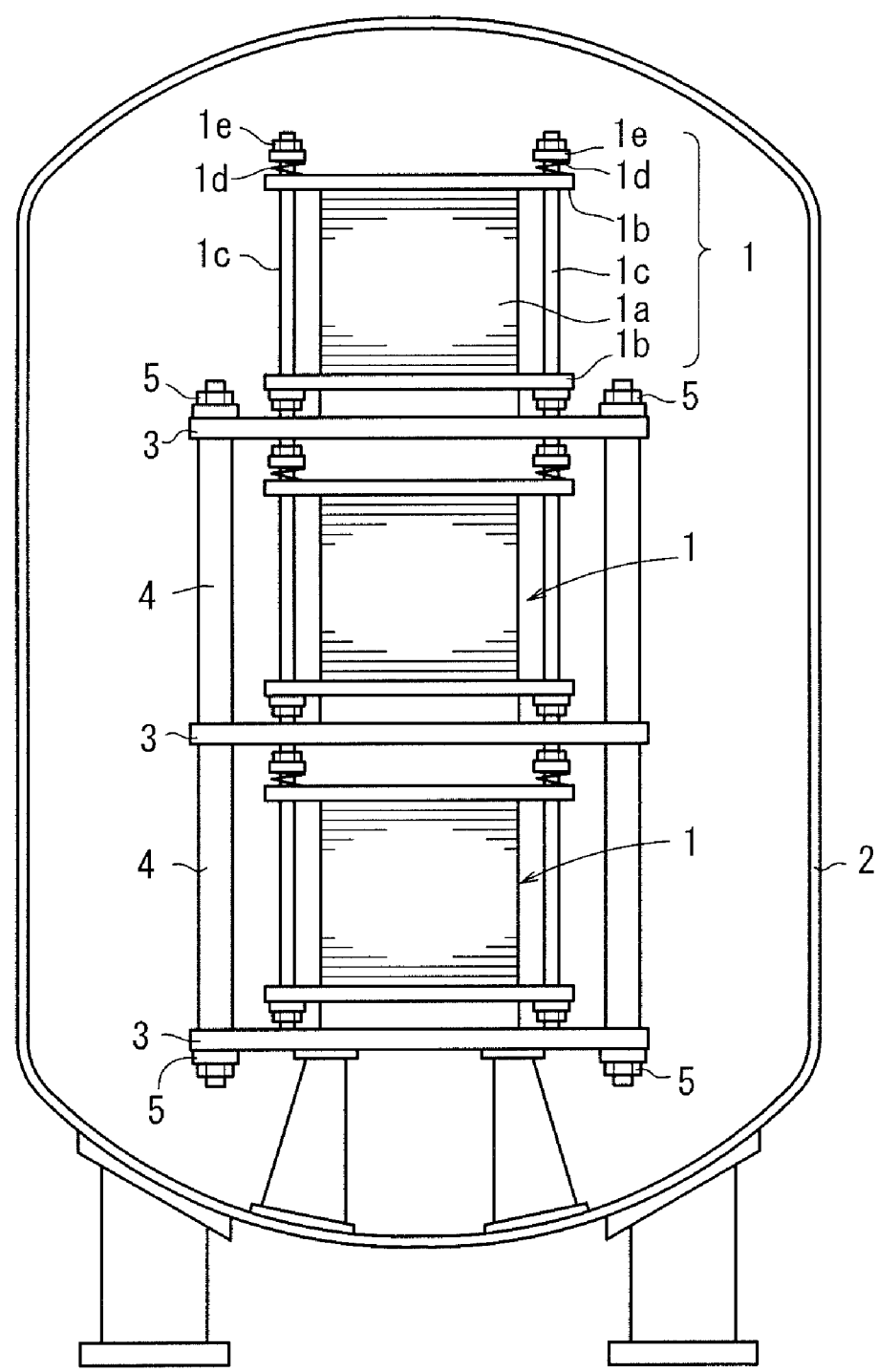
FIG. 13 is a view schematically showing the structure of a conventional fuel cell.

As shown in FIGS. 1, 2, and 12, the first tightening unit 112a includes short first tightening bolts (first bolts) 114a screwed into the screw holes 82 provided along one diagonal line of the end plate 70a. The first tightening bolts 114a extend in the stacking direction of the fuel cells 11, and engage a first presser plate (first plate member) 116a. The first tightening bolts 114a are provided in the oxygen-containing gas supply unit 67 in the separators 28. The first presser plate 116a is a narrow plate, and engages the central position of the separator 28 to cover an insulating seal (predetermined seal region) 69 of the fuel gas supply passage 30.

The second tightening unit 112b includes long second tightening bolts (second bolts) 114b screwed into the screw holes 82 provided along the other diagonal line of the end plate 70a. Ends of the second tightening bolts 114b extend through a second presser plate (second plate member) 116b having a curved outer section. Nuts 117 are fitted to the ends of the second tightening bolts 114b. The second tightening bolts 114b are provided in the oxygen-containing gas supply unit 67 in the separators 28. The thickness of the second presser plate 116b in the stacking direction is small in comparison with the first presser plate 116a. Springs (spring members) 118 and spring seats 119 are provided in respective circular portions of the second presser plate 116b, at positions corresponding to the electrolyte electrode assemblies 26 on the circular disks 36 of the fuel cell 11. For example, the springs 118 are ceramics springs.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 8). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36a of one separator 28 and the surface 36b of the other separator 28. The fuel gas inlet 54 of the circular disk 36 is positioned at the center in each of the anodes 24.

A plurality of the fuel cells 11 are stacked in the direction indicated by the arrow A, and the end plates 70a, 70b are provided at opposite ends in the stacking direction. As shown in FIGS. 1 and 12, the first presser plate 116a of the first tightening unit 112a is provided at the center of the fuel cell 11. The first presser plate 116a has a minimum size necessary for receiving the load in the stacking direction.

In this state, the short first tightening bolts 114a are inserted through the first presser plate 116a and the end plate 70b toward the end plate 70a. Tip ends of the first tightening bolts 114a are screwed into, and fitted to the screw holes 82 formed along one of the diagonal lines of the end plate 70a. The heads of the first tightening bolts 114a engage the first presser plate 116a. The first tightening bolts 114a are screwed into the screw holes 82 to adjust the surface pressure of the first presser plate 116a. In this manner, in the fuel cell stack 12, the first tightening load T1 is applied to the seal region near the fuel gas supply passage 30.

Then, the springs 118 and the spring seats 119 are aligned axially with the electrolyte electrode assemblies 26 at respective positions of the circular disks 36. The second presser plate 116b of the second tightening unit 112b engage the spring seats 119 provided at one end of the springs 118.

Then, the long second tightening bolts 114b are inserted through the second presser plate 116b and the end plate 70b toward the end plate 70a. The tip end of the second tightening bolts 114b are screwed into, and fitted to the screw holes 82 formed along the other diagonal line of the end plate 70a. The nuts 117 are fitted to the heads of the second tightening bolts 114b. Therefore, by adjusting the state of the screw engagement between the nuts 117 and the second tightening bolts 114b, the second tightening load T2 is applied to the electrolyte electrode assemblies 26 by the elastic force of the respective springs 118.

The end plate 70b of the fuel cell stack 12 is sandwiched between the first case unit 86a and the second case unit 86b of the casing 18. The insulating member is interposed between the second case unit 86b and the end plate 70b, and the first case unit 86a and the second case unit 86b are fixed together by the screws 88 and the nuts 90. The fluid unit 19 is mounted in the second case unit 86b. The wall plate 96 of the fluid unit 19 is attached to the groove 74 around the end plate 70a. Thus, the chamber 98 is formed between the end plate 70a and the wall plate 96.

Next, in the fuel cell system 10, as shown in FIG. 1, a fuel (methane, ethane, propane, or the like) and, as necessary, water are supplied from the fuel gas supply pipe 100, and an oxygen-containing gas (hereinafter referred to as "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slit 62 in the separator 28 of each fuel cell 11 (see FIG. 8).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied from the fuel gas inlets 54 to the substantially central positions of the anodes 24, and flows outwardly from the central regions of the anodes 24 along the fuel gas channel 46 (see FIG. 9).

As shown in FIG. 1, air from the air supply pipe 104 flows through the channel 108 of the heat exchanger 14, and temporarily flows into the chamber 98. The air flows through the holes 80 connected to the chamber 98, and is supplied to the oxygen-containing gas supply unit 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 9, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22 (see FIG. 9). At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged into the exhaust gas pipe 106 (see FIG. 1).

In the embodiment of the present invention, the fluid unit 19 including the heat exchanger 14 and the reformer 16 is provided on one side of the fuel cell stack 12, and the load applying mechanism 21 is provided on the other side of the fuel cell stack 12. Therefore, the load applying mechanism 21 is not exposed to the hot exhaust gas or the hot air flowing through the fluid unit 19. With the simple structure, it is possible to suitably improve the durability of the load applying mechanism 21.

At this time, the end plate 70b of the fuel cell stack 12 is sandwiched between the first case unit 86a and the second case unit 86b of the casing 18. The end plate 70b functions as a heat barrier. Therefore, it is possible to further prevent the flow of the hot exhaust gas or the barrier air toward the load applying mechanism 21. The temperature of the load applying mechanism 21 does not change. Thus, improvement in the reliability of applying the load is achieved.

Further, the load applying mechanism 21 includes the first tightening unit 112a and the second tightening unit 112b for applying different loads. The first tightening unit 112a applies the first tightening load T1 to the region near the fuel gas supply passage 30 where reliable seal performance is most required by application of the load to the fuel cell stack 12 in the stacking direction. Thus, improvement in the sealing characteristics in the region near the fuel gas supply passage 30 is achieved, and highly accurate sealing performance is achieved. Further, the power generation efficiency in the fuel cells 11 is improved easily.

Further, the second tightening unit 112b applies the second tightening load T2 to the respective electrolyte electrode assemblies 26. The second tightening load T2 is smaller than the first tightening load T1. Therefore, no excessive load is applied to each of the electrolyte electrode assemblies 26. Accordingly, for example, it is possible to reliably prevent the electrolyte electrode assemblies 26 from being damaged.

Further, in the embodiment of the present invention, the first tightening bolts 114a of the first tightening unit 112a are screwed into the screw holes 82 of the end plate 70a of the fuel cell stack 12. Therefore, the first tightening load T1 in the stacking direction applied by the first tightening unit 112a is received by the central portion of the end plate 70a and the first presser plate 116a. Thus, the load by the first tightening unit 112a is not applied to the outer region of the end plate 70a and the casing 18. Therefore, it is possible to reduce the thickness in the outer region of the end plate 70a and the casing 18.

Likewise, the second tightening bolts 114b of the second tightening unit 112b are screwed into the screw holes 82 of the end plate 70a. Therefore, the second tightening load T2 applied by the second tightening unit 112b is received by the end plate 70a. The load by the second tightening unit 112b is not applied to the casing 18. Further, since the thickness of the second tightening unit 112b in the stacking direction is small in comparison with the first tightening unit 112a, the heat capacity of the load applying mechanism 21 is reduced.

Thus, it is possible to significantly reduce the thickness of the casing 18, and effectively reduce the heat capacity of the entire fuel cell system 10. In particular, it is possible to carry out the warming up operation swiftly at the time of starting operation.

Further, the first and second tightening units 112a, 112b are provided in the oxygen-containing gas supply unit 67 in the separators 28. The first and second tightening units 112a, 112b are not provided outside the separators 28. Therefore, the overall size of the tightening load applying mechanism 21 is small, and it is possible to reduce the size of the entire fuel cell system 10 easily.

Further, the second tightening unit 112b has the springs 118 at positions corresponding to the electrolyte electrode assemblies 26. Therefore, the desired second tightening load T2 is reliably applied to the respective electrolyte electrode assemblies 26 through the springs 118.

The invention has been particularly shown and described with reference to a preferred embodiment, it will be understood that variations and modifications can be effected thereto by those skilled in the art without departing from the spirit and scope of the invention as defined by the appended claims.

What is claimed is:

1. A fuel cell system comprising:
a fuel cell stack formed by stacking a plurality of fuel cells in a stacking direction, said fuel cells each including an electrolyte electrode assembly and separators sandwiching said electrolyte electrode assembly, said electrolyte electrode assembly including an anode, a cathode, and an electrolyte interposed between said anode and said cathode, said fuel cell stack including a fuel gas supply passage extending in the stacking direction for supplying the fuel gas to said anode;
a heat exchanger provided on one side of said fuel cell stack for heating an oxygen-containing gas to be supplied to said fuel cell stack;
a reformer provided on said one side of said fuel cell stack for reforming a fuel to produce a fuel gas;
a load applying mechanism provided on an other side of said fuel cell stack for applying a tightening load to said fuel cell stack in the stacking direction, the fuel cell stack including an end plate at an end on said other side of the fuel cell stack;
a casing containing said fuel cell stack, said heat exchanger, said reformer, and said load applying mechanism,
wherein said load applying mechanism includes a first tightening unit for applying a tightening load to a predetermined seal region of said fuel gas supply passage of said fuel cell stack in the stacking direction and a second tightening unit for applying a load to said electrolyte electrode assembly in the stacking direction, and the load applied by said second tightening unit is smaller than the load applied by said first tightening unit,
wherein the electrolyte electrode assembly where the second tightening unit applies the load in the stacking direction is located radially outside the predetermined seal region where the first tightening unit applies the tightening load in the stacking direction,
wherein the second tightening unit comprises a spring seat contacting the end plate only in a region corresponding to the electrolyte electrode assembly, and a spring member contacting the spring seat to apply the load to the electrolyte electrode assembly in the stacking direction.

2. A fuel cell system according to claim 1, wherein a heat barrier is interposed between said other side of said fuel cell stack and said load applying mechanism.

3. A fuel cell system according to claim 2, wherein said heat barrier includes a plate member supported by said casing.

4. A fuel cell system according to claim 1, wherein said first tightening unit retains the load in the stacking direction through an end plate provided on said one side of said fuel cell stack.

5. A fuel cell system according to claim 4, wherein said first tightening unit includes a first bolt screwed into said end plate provided on said one side of said fuel cell stack; and
a first plate member which engages said first bolt for applying the load to said predetermined seal region of said fuel cell stack in the stacking direction, and
said second tightening unit includes a second bolt screwed into said end plate;
a second plate member which engages said second bolt; and
said spring member interposed between said second plate member and said fuel cell stack for applying the load in the stacking direction to said electrolyte electrode assembly.

6. A fuel cell system according to claim 1, further comprising a fluid unit including at least said heat exchanger and said reformer, wherein said fluid unit and said load applying mechanism are provided symmetrically with respect to a central axis of said fuel cell stack.

7. A fuel cell system according to claim 1, wherein said heat exchanger has a ring shape, said reformer has a cylindrical shape, and said reformer is provided coaxially inside said heat exchanger.

8. A fuel cell system according to claim 1, wherein said first tightening unit includes first tightening bolts, and said second tightening unit includes second tightening bolts, said first tightening bolts and said second tightening bolts being provided in an oxygen-containing gas supply unit inside said separators.

* * * * *